April 7, 1970   F. E. FORD ET AL   3,505,584
CHARGE CURRENT CONTROLLER FOR SEALED ELECTRO-CHEMICAL
CELLS WITH CONTROL ELECTRODES
Filed May 11, 1966   3 Sheets-Sheet 1

INVENTORS
FLOYD E. FORD, PIOTR P. M. LIWSKI
NELSON H. POTTER, KENNETH SIZEMORE

BY *[signature]*
ATTORNEY

April 7, 1970      F. E. FORD ET AL      3,505,584
CHARGE CURRENT CONTROLLER FOR SEALED ELECTRO-CHEMICAL
CELLS WITH CONTROL ELECTRODES
Filed May 11, 1966      3 Sheets-Sheet 2

INVENTORS
FLOYD E. FORD, PIOTR P. M. LIWSKI
NELSON H. POTTER, KENNETH SIZEMORE

BY *O. E. Hodges*

ATTORNEY

INVENTORS
FLOYD E. FORD, PIOTR P.M. LIWSKI
NELSON H. POTTER, KENNETH SIZEMORE

BY

ATTORNEY

Patented Apr. 7, 1970

3,505,584
CHARGE CURRENT CONTROLLER FOR SEALED ELECTRO-CHEMICAL CELLS WITH CONTROL ELECTRODES
Floyd E. Ford, Davidsonville, Piotr P. M. Liwski, Annapolis, and Nelson H. Potter, Berwyn Heights, Md., and Kenneth Sizemore, Washington, D.C., assignors to the United States of America as represented by the Secretary of the Navy
Filed May 11, 1966, Ser. No. 550,090
Int. Cl. H01m 45/04
U.S. Cl. 320—17      15 Claims

ABSTRACT OF THE DISCLOSURE

An automatic charging system for a group of cells of the type having control electrodes includes a detector associated with each cell in the group which samples the control electrode potential at a rapid sampling rate provided by a square wave generator. The detector output is connected to a current control stage which adjusts the cell charging current from an external power supply from full charge to trickle charge to zero as the control electrode voltage increases. A time delay network is provided to adjust the charging current cycle for use with certain types of cells.

---

The invention described herein may be manufactured and used by or for the Government of the United States of America for governmental purposes without the payment of any royalties thereon or therefor.

This invention relates to battery charging systems and more particularly to a system for charging electrochemical cells of the nickel-cadmium type having control electrodes.

The use of nickel-cadmium cells has become extremely widespread in the electronics industry in recent years in equipment ranging from spacecraft to hearing aids. Such cells offer the advantages of being highly efficient, compact and reliable; they can be recharged an indefinite number of times and, unlike other types of secondary cells, can be hermetically sealed since it is not necessary to add electrolyte and there is no problem of leakage and spillage of fluid. In addition, they offer extremely long life under a wide range of operating conditions.

The advantages of such cells become disadvantages, however, in certain instances. While the cells are being recharged, oxygen gas is liberated at the nickel electrode. Although oxygen gas is generated slowly during most of the charging period, as the cell approaches its maximum rated charge condition the amount of oxygen evolved increases rapidly which condition will continue as the cell becomes overcharged. Because the cells are hermetically sealed the gas pressure under these conditions may rise to dangerously high levels which can result in an explosion or otherwise cause damage to the cells as well as neighboring equipment.

This problem is complicated by the fact that the nickel cadmium cells have a relatively flat terminal voltage versus cell capacity characteristic. Consequently, monitoring the terminal voltage to ascertain the state-of-charge (the common technique with most secondary cells) is of no value when dealing with nickel-cadmium cells. Accordingly, it has been difficult to maintain such cells at 100 percent of rated capacity by known automatic charging techniques. More often than not, the cells were either undercharged, resulting in reduced capability or overcharged, risking the danger of an explosion.

Recently, there has been developed a nickel-cadmium cell which has a third control electrode in addition to the anode and cathode. This control electrode develops a voltage potential with respect to the cell anode (negative electrode) as a direct function of the number of oxygen molecules in the cell.

Briefly, the invention contemplates a system for automatically charging a group of cells connected in series configuration. A detector section, containing a detector for each cell, samples the control electrode potential of its respective cell at a rapid sampling rate provided by a square wave generator. The output of each of the detectors is a D-C level which is fed to a current control section which adjusts the battery charging current from an external supply from full charge to trickle charge to zero as the control electrode voltage increases. The charge current control utilizes an entirely solid state series control network to control the rate of charge.

In addition a time delay network is employed to adjust the charging current cycle for use with certain types of cells.

Accordingly, it is an object of this invention to provide a system for automatically charging sealed electrochemical cells of the type having a control electrode.

Another object of this invention is to provide a system for maintaining nickel-cadmium batteries of the control electrode type in an optimum charged state.

A further object of this invention is to provide a system for continually monitoring the state-of-charge of control electrode type cells.

A still further object of this invention is to provide a battery charging system which is entirely solid state and requires no mechanical components.

Other objects and advantages of this invention will become apparent from the following description and drawings wherein.

Figure 1:
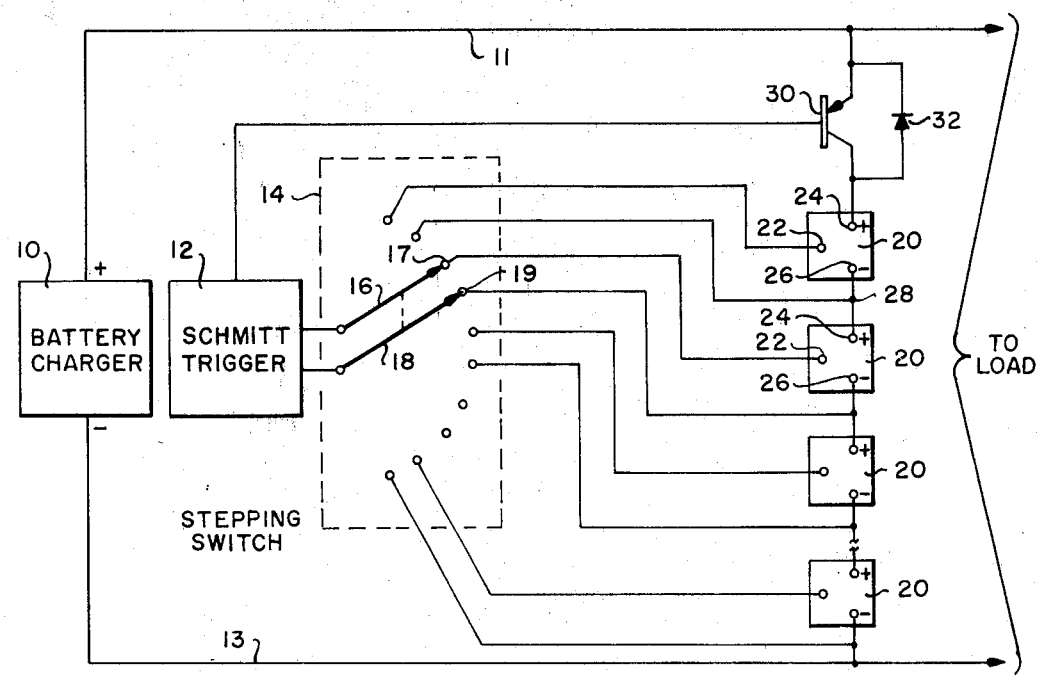
FIG. 1 is a schematic diagram of a prior art system for automatically charging cells.

Referring now to FIG. 1, there is shown a prior art system for charging cells which employs mechanical components. The system comprises charging systems which supplies charging current to a battery comprised of cells 20 of the hermetically sealed electro-chemical type such as nickel-cadmium cells. Each of the cells 20 is provided with a positive electrode (cathode) 24 and a negative electrode (anode) 26. In addition each cell 20 is provided with a third electrode 22 which is utilized for control purposes. Electrode 22 is adapted to provide a voltage potential (with respect to anode 26) proportional to the number of oxygen molecules in the cell which become liberated as the cell is recharged. It is a characteristic of cells of the nickel-cadmium type that oxygen gas is evolved during charging. The rate of oxygen liberation is relatively slow until the cell approaches its maximum charge condition when the rate of liberation increases rapidly. Thus, the charge condition of the cell is ascertainable from the amount of oxygen gas present in the hermetically sealed cell and the voltage potential caused thereby on the control electrode.

It is to be understood that the invention may be utilized with any other type of cell having a control electrode which develops a potential responsive to the state-of-charge of the cell, including two-terminal type cells. For example, the cell disclosed in U.S. Patent No. 2,988,590, may be advantageously used in accordance with the principles of this invention.

A further application of the invention would be in conjunction with cells having pressure transducers which convert internal gas pressure (caused by charging) to a voltage potential.

Cells 20 are arranged in series configuration with positive electrode 24 of one cell connected to negative electrode 26 of the next adjacent cell and so on down the line. The battery of cells is placed across the load, not shown. Shunting the battery is battery charger 10 having positive and negative terminals. The negative electrode is connected via lead 13 to the negative electrode 26 of the end cell of the battery. At the other end of the battery of cells, switching transistor 30 is connected between lead 11 from the positive terminal of battery charger 10 and the end positive electrode of the battery. The emitter of switching transistor 30 is connected to lead 11 while the collector is connected to positive electrode 24 of cell 20. A diode 32 is shunted across the emitter and collector of transistor 30. (Although a PNP type transistor is shown, an NPN type may be used as well.) The base of transistor 30 is connected to the output of a Schmitt trigger 12. Connected to each of cells 20 of the battery are leads extending to the terminals of a stepping switch 14. For each cell 20, one lead is connected between control electrode 22 and terminal 17 of stepping switch 14. Another lead is connected to the junction 28 between the negative electrode 26 of one cell and the positive electrode 24 of the next adjacent cell. This lead is connected to terminal 19 of stepping switch 14. The stepping switch 14 has two contact arms 16 and 17 connected, respectively, to terminals 17 and 19. Contact arms 16 and 17 are ganged, as shown so that they may be moved in unison. For monitoring purposes, contact with each of the cells 20 is made between control electrode 22 and junction 28. The stepping switch outputs are fed to the inputs of Schmitt trigger 12.

In operation, the battery of cells 20 supply current to the load placed across leads 11 and 13. The control electrode potential of each cell, which is indicative of the state-of-charge as hereinbefore described, is sequentially sampled by means of the stepping switch 14. The voltage potential is fed into the Schmitt trigger 12 which acts as a switch; i.e. it will turn "on" when the input voltage from control electrode 22 exceeds a certain value and will turn "off" when the input drops below a certain value. The output of Schmitt trigger 12 is connected to the base of transistor 30 controlling the bias thereof.

Thus, as charging current flows from the charger 10 through the emitter and collector of switching transistor 30 and through the battery of cells 20 the potential on control electrode 22 will increase to a point where it will cause the Schmitt trigger 12 to turn "on." When Schmitt trigger 12 turn "on" the bias on the base transistor 30 will cause it to switch "off" thereby halting the flow of charging current to the battery. Diode 32 is biased to allow the load to be energized by the battery of cells 20 when transistor 30 is turned "off."

The disadvantage of the stepping switch method is the low reliability due to the dependence on mechanical parts. In addition, the system is slow acting, heavy and bulky.

Figure 2:
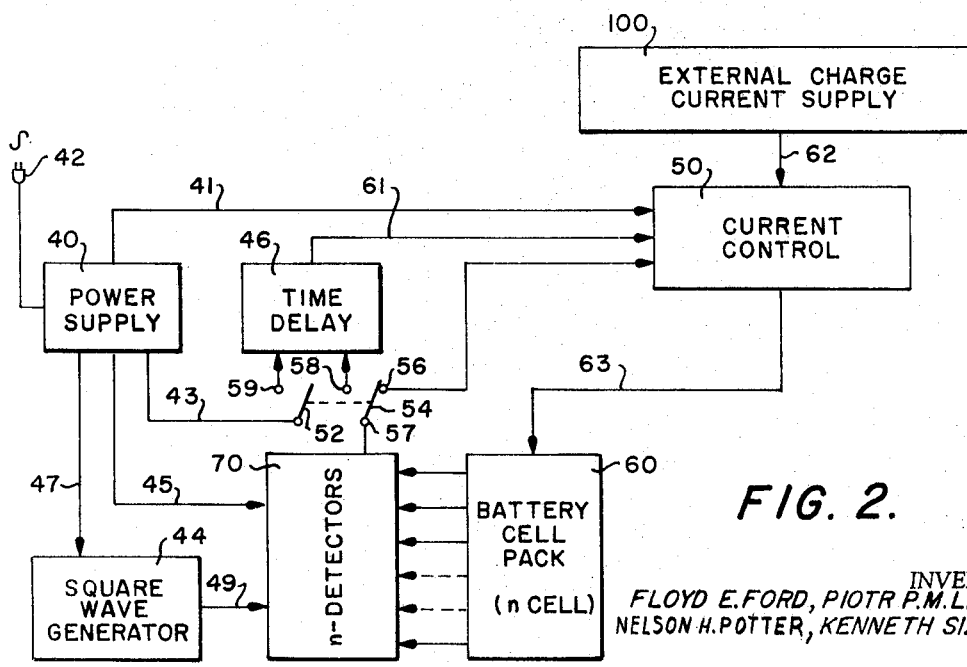
FIG. 2 is a block diagram representation of the various components comprising the invention.

Turning now to the invention, FIG. 2 shows the system contemplated thereby. A power supply 40 which derives A-C power from the mains via plug 42 supplies D-C power of the proper level to the various subsystems. Thus, the current control network 50 is powered via lead 41, the square wave generator via lead 47 and the detector network via lead 45. The time delay network 46, which is used when charging certain types of cells, is powered by means of lead 43 and is switched on and off by switch contact 52 and input terminal 59.

Figure 3:
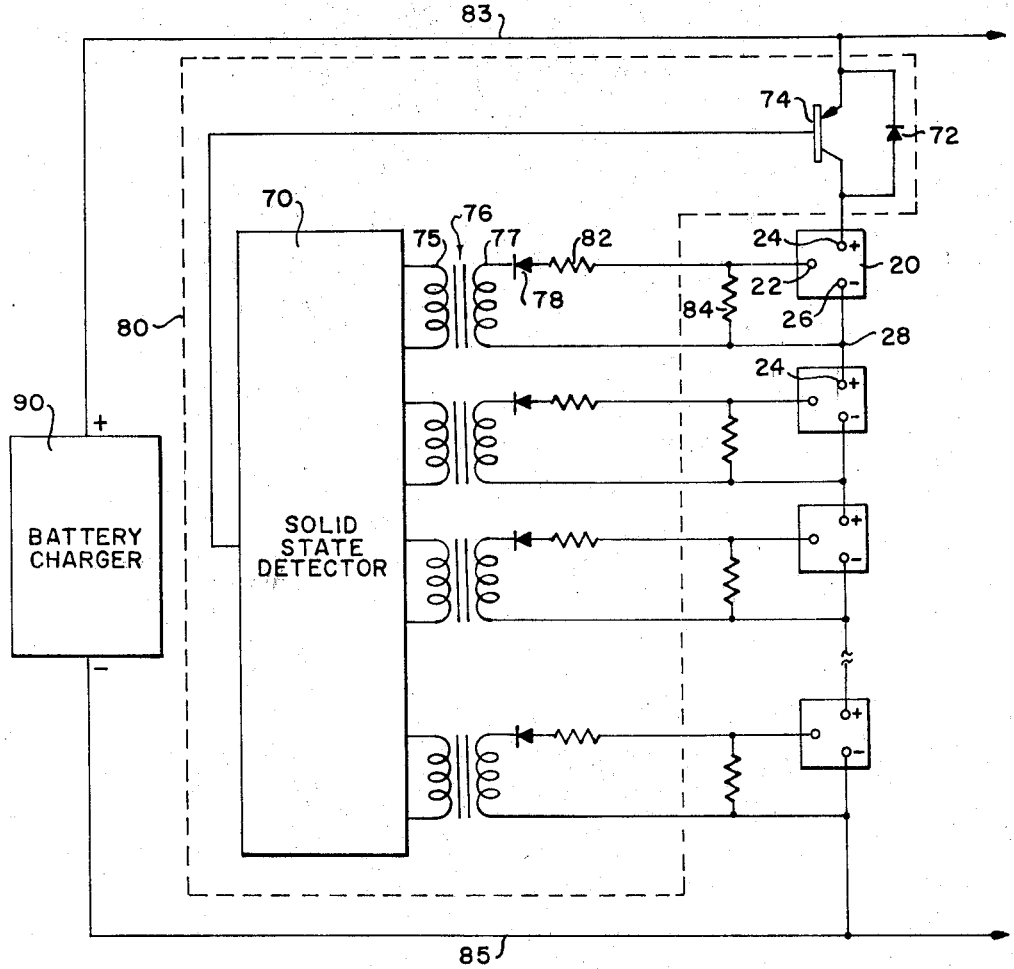
FIG. 3 is a block diagram showing in more detail the essential elements of the charge control circuit.

A battery cell pack similar to that shown in FIG. 1 includes any convenient number of cells (n) connected in series and is designated by reference numeral 60. The cells are charged by current from an external charge current supply 100 which flows by means of lead 62 to the current control network 50 and thence via lead 63 to the battery cell pack 60. Connected to the control electrode of each cell in the battery pack is a connection leading to the detector subsystem 70. Detector subsystem 70 includes a detector network for each one of the cells in battery pack 60. As is shown more fully in FIG. 3 (showing how the detector portion 80 of the invention could be used to replace the stepping switch of FIG. 1—transistor 74 and diode 72 operate as their counterparts in FIG. 1), each detector network comprises a leakage resistor 84 connected between the control electrode 22 and junction point 28. Resistor 82 and diode 78 are connected in series between cell 20 and the D-C side 77 of transformer 76. The A-C side 75 of transformer 76 is connected to remaining portions of detector subsystem 70 as will be more fully described hereinafter. Considering, again, FIG. 2 a square wave generator 44 is connected through lead 49 to each of the detectors in the subsystem 70 and provides a switching signal which drives the detectors thereby causing them to sample the control electrode potential of the respective cells at the switching rate. In an actual embodiment of the invention, the sampling rate was selected, for convenience, at approximately 500 c.p.s.

The output 57 of detector subsystem 70 is a D-C signal which is fed either directly or through a time delay network 61 to the current control network 50 which processes the D-C signal and adjusts the rate-of-charge from current supply 100 from full through trickle to zero charge.

Figure 5:
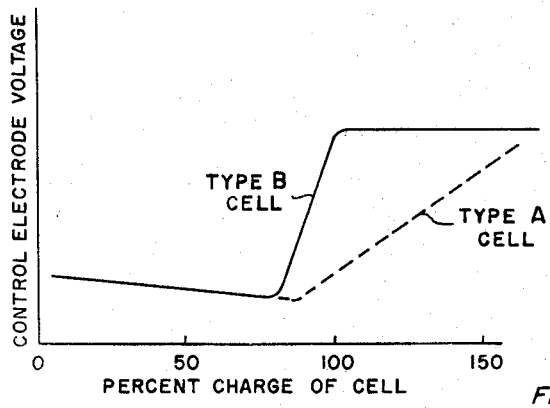
FIG. 5 is a graph showing the control electrode voltage versus percent of charge characteristic of two types of cells employed in the invention.

Time delay network 46 is utilized for charging certain types of nickel-cadmium cells. Referring to FIG. 5, there is shown a graph of the control electrode voltage versus the percent charge of cell characteristic for the types of nickel-cadmium cells adaptable for use with this invention. The adhydrode or Type-A cell has a characteristic which increases almost linearly from 90% to 140% charge. The Type-B or oxygen fuel nickel-cadmium type cell has a characteristic which increases sharply from 90% to 100% charge and then levels off. In general, all types of nickel-cadmium cells should be recharged to 110%–140%, depending on temperature, to maintain their ampere-hour capacity and thus insure maximum reliability. It can be seen that with the Type-A cell, an exact voltage trip point can be selected depending on what percent recharge is desired. However, the Type-B characteristic makes this impossible since at the 100% (or above) state-of-charge, the control electrode voltage remains constant. Consequently, some means is required to insure full recharge of such cells.

The time delay network overcomes this problem by causing the tapering off of charging current to be delayed a convenient interval of time after the voltage trip point has been reached. For instance, the voltage corresponding to 90% charge could be selected as the trip point but current flow would be continued for five minutes thus charging the cell to full capacity.

Time delay network 46 can be activated for charging Type-B cells by throwing switch 54 so that the output 57 of the detectors 70 is connected to input 58 of the time delay network.

To reiterate the operation of the charging system shown in FIG. 2, when Type-A cells are being charged the circuit admits full-charge current into the battery of cells when they are in a discharged state. As any one cell nears its fully charged condition, its control electrode potential begins to increase from zero. As this potential increases further the charge-control section of the circuit begins to decrease the charging current into the cells. As any cell control electrode potential increases above a certain value, charging current increases linearly; the current is reduced to trickle charge when the control electrode potential of any cell has reached a predetermined value. The circuit will remain in this trickle-charge condition as long as a control electrode potential remains or exceeds a preset value. If all control electrode potentials fall below that value, the charge current will increase linearly and again be controlled by the highest control electrode potential in the group of cells comprising the battery.

When Type-B cells are being charged, the circuit will allow a full charge current into the battery of cells. However, in this mode, when the control electrode potential of any cell increases to a predetermined value, a time delay of several minutes is initiated. For the next few minutes, say five, a full-charge current will continue into the cell, regardless of the condition of their control electrode potentials. At the end of the five minutes, control of the charging current will again be governed by the cell having the highest control electrode potential. At this point if the potential is below a certain predetermined value, the full-charge current will continue; if it is between that value and a higher predetermined value, the charging current will decrease to a value proportional to it; if it is above the maximum predetermined value, the charging current will immediately reduce to its trickle-current level. That is, at the end of the 5-minute time delay, the operation of the circuit when charging Type-B cells is identical to the mode wherein Type-A cells are charged.

Figure 4:
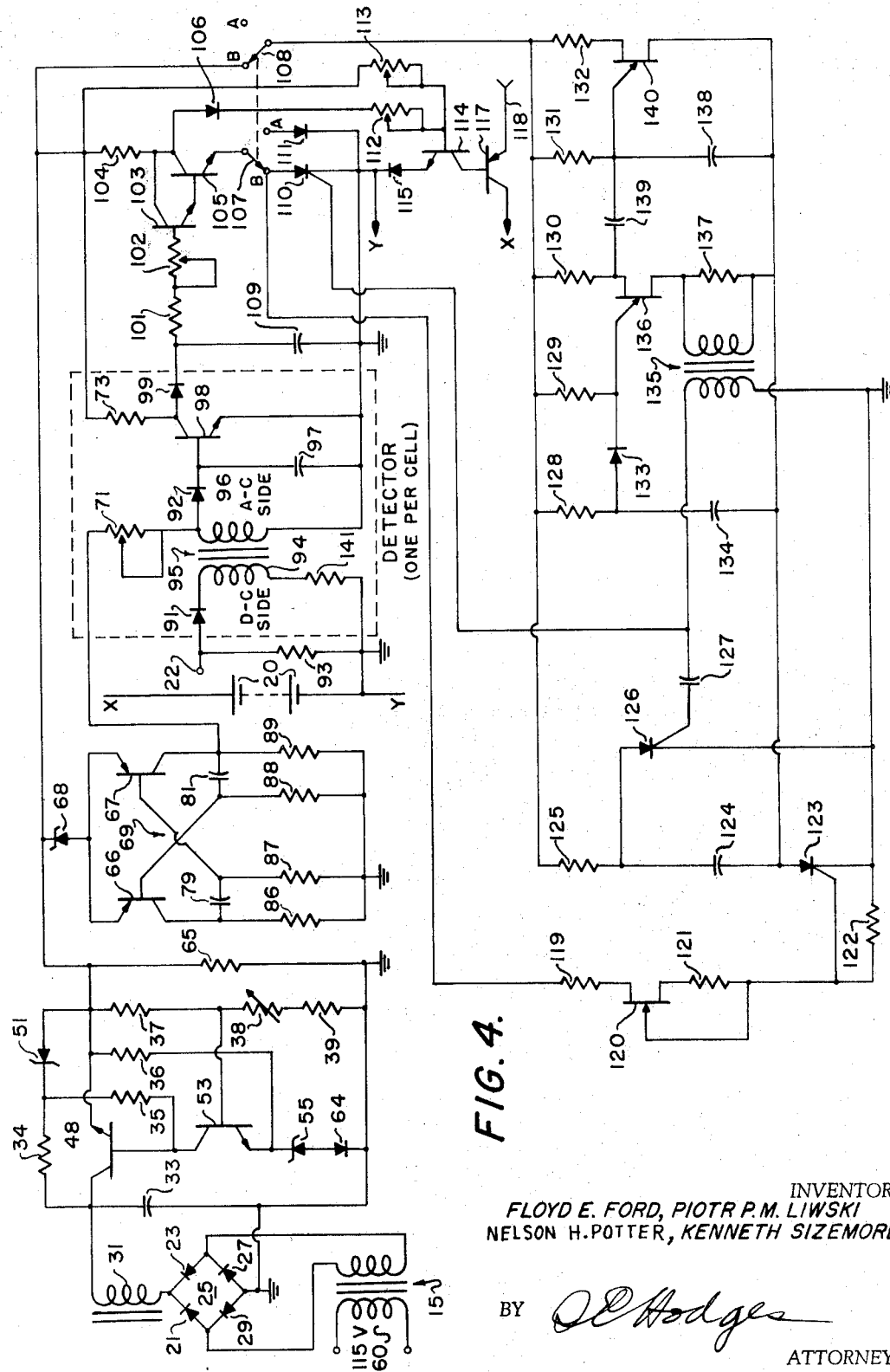
FIG. 4 is a circuit diagram of the cell charging system.

Referring now to FIG. 4 which shows a circuit diagram of the invention, a power supply, which may be connected to the A-C mains, comprises a transformer 15 having a primary and secondary winding. The secondary of power transformer 15 is connected to a standard bridge rectifier 25 consisting of diodes 21, 23, 27 and 29. One node of the diode bridge is grounded between diodes 27 and 29 while the secondary of the transformer feeds the nodes between diodes 21 and 29 and 23 and 27, respectively. Connected to the node between diodes 21 and 23 is an iron core inductor 31. A capacitor 33 is connected in parallel across the inductor 31 and ground and serves to complete the ripple filtering network. The output of the power supply is connected to a voltage regulator stage which comprises transistors 48 and 53 connected in series. The junction of inductor 31 and capacitor 33 is connected to the collector of transistor 48. The base of transistor 48 is connected to the collector of transistor 53. Biasing resistors 34 and 35 are connected in series between the collector of transistor 48 and the base thereof while resistors 36 and 37 are connected, respectively, to the emitter of transistor 53 and the base thereof. A Zener diode 51 is connected between resistor 34 and resistor 37. Variable resistor 38 and resistor 39 are connected in series between the base of transistor 53 and ground. The emitter of transistor 53 is connected to ground by a Zener diode 55 and a conventional diode 64. The regulated output voltage is taken off the emitter of transistor 48 and ground, across shunt resistor 65, and is fed to the other subsystems and networks.

A square wave generator 69 comprised of a conventional flip-flop multivibrator provides a switching voltage for the detector networks. Square wave generator 69 comprises transistors 66 and 67 having their emitters connected to each other. The collectors of transistors 66 and 67 are connected to ground through resistors 86 and 89, respectively. The base of transistor 66 is connected to the collector of the transistor 67 via capacitor 81, while the base of the transistor 67 is connected to the collector of transistor 66 via capacitor 79. A resistor 87 is connected between capacitor 79 and the base of transistor 67 to ground and a resistor 88 is connected between capacitor 81 and the base of transistor 66 to ground. The output of the square wave generator 69 is taken off the collector of transistor 67. A Zener diode 68 connected between the regulated D-C supply line and the emitter of the flip-flop provides a constant supply voltage to the square wave generator stage.

A detector stage is provided for each of the cells 20 in the battery and comprises a transformer 95 having a D-C side and an A-C side designated by reference numerals 94 and 96, respectively. The D-C side is connected by means of diode 91 to the control electrode 22 of the cell.

A resistor 93 is connected between control electrode 22 and ground while resistor 141 is connected from transformer winding 94 to ground. The A-C side of the detector comprises a winding 96, one side of which is connected via diode 92 to the base of amplifying transistor 98. The base of transistor 98 is connected to ground via a capacitor 97. The switching signal output of square wave generator 69 is connected via variable resistor 71 to the winding 96 of transformer 95. Transistor 98 is biased by a resistor 73 connected to the collector thereof and to the bias supply line. The emitter of transistor 98 is grounded while connected to the collector is connected through diode 99 in series with resistor 101 and a variable resistor 102 to the base of transistor 103. A capacitor 109 is connected between ground and the junction of diode 99 and resistor 101.

The operation of the detector network is as follows: resistor 93 serves as a leakage resistor for the potential developed between control electrode 22 and the negative terminal of an individual cell 20 of the battery. If the cell is in a discharged condition its control electrode potential is virtually zero; thus, no DC flows through diode 91, resistor 141 and the D-C winding 94 of transformer 95 since the diode is back-biased.

Now, it can be shown that the combination of diode 91, resistor 141 and winding 94 on the D-C side of transformer 95 will "reflect" onto the A-C side with the following characteristic: as the voltage across diode 91 and resistor 141 increases, the current through them increases and their reflected impedance decreases. Consequently, as the control electrode potential increases, the reflected impedance decreases.

Under the zero control electrode potential condition, the square wave switching signal fed through resistor 71 to the A-C side of the detector will experience a high reflected impedance in parallel with capacitor 97. Consequently, most of the energy of the square wave will be stored in capacitor 97, since the path through diode 92 and the capacitor to ground is a lower impedance than the reflected impedance. This allows the capacitor 97 to maintain a D-C voltage level sufficient to bias transistor 98 "on" in saturation. As the nickel cadmium cell charges its control electrode potential increases thus allowing a low D-C current to flow through diode 91, resistor 141 and D-C side of transformer 95. As this current increases (with an increasing control electrode potential) the dynamic impedance of diode 91 decreases thus lowering its reflected impedance as seen by the square wave. As this impedance decreases more energy is dissipated through transformer 95 and less is stored in capacitor 97. This will lower the D-C voltage maintained by capacitor 97 and will cause transistor 98 to travel through its active region toward cutoff. When transistor 98 is near saturation its collector voltage is held at a low voltage but as it moves through the active region toward cutoff its collector voltage increases from less than one volt toward the maximum, equal to the bias supply voltage. The respective detectors are connected commonly at the cathodes of diodes 99 and consequently act as an or circuit, meaning that the detector voltage having the highest value is the voltage which appears at the input to the current control stage. Therefore, it is this input which will control the current control stage.

The output of the detector stage is taken from diode 99 and is fed to the input of the current control stage by means of resistor 101 and variable resistor 102 which are connected in series. A capacitor 109 is connected between ground and the junction of diode 99 and resistor 101. Calibration resistor 102 (used for compensating for any charges in gain in transistor 105) is connected to the base of transistor 103. Transistors 103 and 104 are connected as a Darlington pair; that is the collector of transistor 103 is connected to the collector of transistor 105 and the emitter of transistor 103 is connected to the base of transistor 105. A biasing resistor 104 is connected from the D-C power supply to the collectors of transistors 103 and 105. An input terminal 118 receives current from an external charge current supply (not shown) and feeds the emitter of transistor 117. The base of transistor 117 is connected to the collector of transistor 114 and the collector of transistor 117 is connected to the positive terminal of the battery of cells 20 which are to be charged. Connected to the emitter of transistor 114 is a diode 115. The negative terminal of battery 116 is connected along with the cathode of diode 115 to the ground. Diode 106 is connected from the collector of transistor 105 via a variable resistor 112 to the base of transistor 114. In addition, a resistor 113 is connected between the base of transistor 114 and the D-C bias supply. Resistors 112 and 113 are used to adjust the valves of the full-charge and trickle-charge currents, respectively. The current control stage functions by responding to the changing DC voltage level from the output of the detector stages and regulates the DC current output from the external charge current supply. With selector switch 107/108 in the A position the time delay section is not activated. The rising detector output voltage (caused by an increasing control electrode potential on cell 20) will bias the Darlington transistor pair 103 and 105 "on" from cutoff toward saturation, thus lowering the collector voltage of transistors 103 and 105. As the collector voltage of the Darlington pair decreases, the base current of transistor 114 is decreased thus reducing its collector current. The decreasing collector current in transistor 114 is the same as a decreasing base current in transistor 117. If the base current of transistor 117 is reduced, its collector current is reduced proportionally thus decreasing the charging current from the external current supply into the battery of nickel-cadmium cells. This will be reduced to a trickle charge level when any control electrode potential reaches a certain predetermined value, selectable by adjusting resistor 71.

The time delay section which is utilized for charging certain types of cells as heretofore described utilizes a unijunction transistor timing circuit adjusted to yield an output pulse a certain interval of time after being activated. The time delay circuit is activated from the bias D-C supply via switch 108 thrown in the B position as shown in the drawings. When switch 107 is thrown in the B position the emitter of transistor 105 is connected via resistor 119 to the drain electrode of the field-effect transistor 120. A silicon control rectifier 110 is connected between terminal B of switch 107 and ground. The gate of field-effect transistor 120 is connected to the source electrode through resistor 121 to the gate electrode of silicon controlled rectifier 123. A resistor 122 is connected between the gate of silicon controlled rectifier 123 and the cathode thereof. A resistor 125 and capacitor 124 are connected in series between the anode of silicon controlled rectifier 123 and the D-C bias supply line. Another silicon controlled rectifier 126 is connected from the junction of resistor 125 and capacitor 123 and the cathode of silicon controlled rectifier 123 and ground. The gate electrode of silicon controlled rectifier 126 is connected via capacitor 127 through the secondary winding of transformer 135 to ground. The gate electrode of silicon controlled rectifier 110 is connected to the junction of capacitor 127 and the secondary winding of transformer 135. A resistor 128 and capacitor 134 are connected in series between the bias supply line and the cathode of silicon controlled rectifier 123. A diode 133 is connected between the junction of resistor 128 and capacitor 134 and the emitter of unijunction transistor 136. One base of the unijunction transistor 136 is connected to the bias supply line via resistor 130 while the other base of the unijunction transistor 136 is connected via resistor 137 to the anode of silicon controlled rectifier 123. A resistor 129 is connected between the bias supply line and the emitter of unijunction transistor 136. The primary winding of transformer 135 is placed in parallel with resistor 137. The first base of unijunction transistor 136 is connected via capacitor 139 to the emitter of unijunction transistor 140. One base of unijunction transistor 140 is connected to the bias supply line through resistor 132; the other base of unijunction transistor 140 is connected to the anode of silicon controlled rectifier 123.

The operation of the time delay network is as follows: with selector switch 107/108 in the B position the power supply is connected to the time delay circuit but it is not activated until silicon controlled rectifier 123 has been gated "on." Also when switch 107/108 is in this position the emitter of transistor 105 will not be connected to ground until silicon controlled rectifier 110 has been gated "on." When any control electrode potential reaches a certain predetermined value the detector output voltage is at a level sufficient to gate "on" the silicon controlled rectifier 123 through the field effect transistor 120 thus activating the time delay circuit.

The time delay is effectuated by means of unijunction transistors 140 and 136. Applying the bias supply voltage across resistor 131 and capacitor 138 will cause the latter to charge approximately according to the time constant R-C. As capacitor 138 continues to charge the voltage on the emitter of unijunction transistor 140 increases causing it to become forward-biased thus lowering its impedance. At this point capacitor 138 will discharge through unijunction transistor 140. The current will then flow around to the combination of capacitor 134 and resistor 138 where a similar event occurs. Capacitor 134 will discharge through diode 133 through unijunction transistor 136 and resistor 137 causing a pulse to flow through transformer 135 to capacitor 127 and the gate of silicon controlled rectifier 126. Up to this point transistor 105 has been unable to control the remaining portion of the current control section since its emitter is floating. Therefore the standing bias condition on transistor 114 maintains the charging current at full charge. Several minutes after the activation of the time delay circuit its output pulse flowing through transformer 135 will gate "on" silicon controlled rectifier 110, thus allowing the detector output through transistors 103 and 105 to control the value of charging current into the battery of cells. The same pulse which gated "on" silicon controlled rectifier 110 also gates silicon controlled rectifier 126 "on" enabling the energy stored in capacitor 124 to turn "off" silicon controlled rectifier 123 and deactivate the time delay circuit. At this point the value of the charging current will depend on the detector output and its control will be the same as that described heretofore for the A mode of charging. Obviously, numerous modifications are possible within the scope of this invention which is to be measured by the following claims.

What is claimed is:

1. A system for charging cells of the sealed electrochemical type having a control electrode whose voltage potential is indicative of the state of charge comprising:

a source of current for charging cells;

current control means for regulating the amount of current flowing to said cells from said source of current;

detector means for controlling said current control means including variable impedance means responsive to the voltage potential of the control electrode of said cells, said variable impedance means having a transformer with both primary and secondary windings, said primary winding connected by means of a back-biased diode to said control electrode which becomes increasingly forward biased as said cells become charged and said secondary winding connected to said current control means;

a generator and an energy storage means connected to said secondary winding;

whereby current flowing to said cells will be automatically regulated according to the state of charge of said cells.

2. A system as set forth in claim 1 wherein:
detector means are provided for each cell, and
a diode connected to the secondary winding of each detector means and said current control means,
said detector means being commonly connected at the cathode of each of the diodes connected to the secondary windings, thereby forming an OR circuit.

3. A system as set forth in claim 1 wherein said current control means comprises:
a first switching stage,
a second switching stage connected thereto, and
a control stage connected to said second switching stage,
said first switching stage being connected to said detector means,
said source of current being connected to one input of said control stage,
the output of said control stage being connected to said cells,
said first switching stage turning said second switching stage on in response to the output of said detector means,
said second switching stage controlling said control stage,
whereby the current flowing into said cells will be regulated.

4. A system as set forth in claim 3 wherein:
said first switching stage including a first transistor and a second transistor,
said first transistor having its base connected to the output of said detector means and its emitter connected to the base of said second transistor,
said first and second transistors being connected in common at their collectors.

5. A system as set forth in claim 4 wherein:
said second switching stage comprises a transistor, and
said control stage comprises a transistor having its base connected to the collector of said switching stage transistor, its emitter connected to said source of current and its collector connected to said cells.

6. A system as set forth in claim 5 further including:
time delay means selectably connected between said detector means and said current control means for allowing continuance for an interval of time of charge current to said cells after a predetermined control electrode voltage has been reached.

7. A system as set forth in claim 6 wherein: said time delay means comprises a unijunction transistor network.

8. A system as set forth in claim 7 wherein:
said unijunction transistor network is connected through a first controlled rectifier to a source of power, and further including:
a second controlled rectifier connected between said first switching stage and said second switching stage,
a second controlled rectifier connected between said first switching stage and said second switching stage,
transformer means connected to the output of said unijunction transistor network and to the gate electrode of said second controlled rectifier, and
the gate of said first controlled rectifier being connected to the output of said first switching stage.

9. A system as set forth in claim 8 further including:
a third controlled rectifier connected across said source of power and having its gate electrode connected to the output of said transformer means and the gate electrode of said second controlled rectifier.

10. A system as set forth in claim 8 further including:
field effect transistor means connected between the gate electrode of said first controlled rectifier and the output of said first switching stage.

11. A system as set forth in claim 7 wherein:
said unijunction transistor network comprises a first unijunction transistor having a resistor and capacitor connected to the emitter electrode thereof,
a second unijunction transistor,
diode means connected to the emitter thereof, and
a resistor and a capacitor connected to said diode means,
the emitter of said first unijunction transistor being connected through a capacitor to one base electrode of said second unijunction transistor.

12. A system for regulating the state-of-charge of each cell of one or more cells of the sealed three electrode electro-chemical type where the voltage potential at one electrode of a cell is related to the state-of-charge of such comprising:
a current source for charging at least one of said one or more cells;
current control means for regulating current flow to at least one of said one or more cells from said current source, said control means connected between the current source and said at least one of said one or more cells with an additional terminal on said current control means for receiving control signals;
detector means including variable impedance means connected between said one electrode and said additional terminal responsive to changes in voltage potential at said one electrode and developing a control signal which is directed to said additional terminal; and
said detector means further including a diode which is reverse biased when said cell is in a discharged state and which becomes increasingly less reverse biased as said cell becomes increasingly charged.

13. A system for regulating the state-of-charge of each cell of one or more cells of the sealed three electrode electro-chemical type where the voltage potential at one electrode of a cell is related to the state-of-charge of such comprising:
a current source for charging at least one of said one or more cells;
current control means for regulating current flow to at least one of said one or more cells from said current source, said control means connected between the current source and said at least one of said one or more cells with an additional terminal on said current control means for receiving control signals;
detector means including variable impedance means connected between said one electrode and said additional terminal responsive to changes in voltage potential at said one electrode and developing a control signal which is directed to said additional terminal; and
said detector means further including an energy storage device.

14. A system as set forth in claim 12 wherein said detector means also includes an energy storage device.

15. A system as set forth in claim 14 wherein said one or more cells is connected to an equal number of a plurality of detector means, such plurality is driven by a square wave generator, said detector variable impedance means is a transformer and said energy storage means is a capacitor.

References Cited

UNITED STATES PATENTS 3,005,943 10/1961 Jaffe _____ 320—13
3,315,140 4/1967 Dadin _____ 320—48
3,348,118 10/1967 Watrous _____ 320—40

LEE T. HIX, Primary Examiner

S. WEINBERG, Assistant Examiner

U.S. Cl. X.R.
320—24, 31, 39, 43